UNITED STATES PATENT OFFICE.

ORSON P. BEARDSLEY, OF McDONOUGH, NEW YORK.

IMPROVEMENT IN PROCESSES OF REFINING MAPLE-SUGAR.

Specification forming part of Letters Patent No. 33,289, dated September 17, 1861.

*To all whom it may concern:*

Be it known that I, ORSON P. BEARDSLEY, of McDonough, in the county of Chenango and State of New York, have invented an Improved Process of Refining Maple-Sugar, which I have described in the following specification with sufficient clearness to enable competent and skillful workmen in the arts to which it pertains or is most nearly allied to make and use my invention.

In even the best maple-sugar, as now manufactured by the ordinary process, a gritty and unpleasant or chalky taste is apparent which reduces its pleasantness and value. The coarser particles of impurities are generally removed by straining the sirup while in a thin or limpid state, settling, and decanting, &c.; but the ingredients which produce the result of which I am speaking resist all the common and usual cleansing operations. An analysis of this substance extracted from the sugar after the ordinary appliances had failed to remove it found it to contain about thirty-six per cent. of magnesia and some other earthy matter and about fifty per cent. of vegetable or volatile matter. This substance, as before stated, resists the ordinary means employed for the removal of impurities. When the sirup is in the limpid state (which is the one in which the sugar-makers strain it) this substance is so intimately combined with the water in which the sugar is dissolved that the straining will not remove it, nor will decantation, after allowing it time to settle, accomplish the purpose, probably for the same reason. I have, however, found by experiment that when the sirup is boiled down nearly or quite to the consistency of sugar a change takes place in its structure. The magnesia and its adherents then assume a distinct form, and by then straining the sugar through a thick woolen cloth this foreign substance is taken up and may be removed. This operation must, however, be performed while the sugar is only sufficiently fluid to allow it to pass with difficulty through the cloth, and a thick woolen cloth should be used in preference to any other, as its barbed fibers are better suited than other fabrics to the extraction of this impurity.

I do not claim straining the sirup, when in a limpid state, through the strainer, of whatever material or construction; but

I claim—

The extraction of the magnesia and its adherent impurities by straining it through a thick cloth after or when the sugar has been so far concentrated as to cause the magnesia to granulate or assume a distinct form, in which it can be thus removed.

ORSON P. BEARDSLEY.

Witnesses:
RICHARD A. SMITH,
I. P. STRONG.